United States Patent
Nakada et al.

(10) Patent No.: US 12,134,813 B2
(45) Date of Patent: Nov. 5, 2024

(54) BURRING PROCESSED MEMBER

(71) Applicant: NIPPON STEEL CORPORATION, Tokyo (JP)

(72) Inventors: Kohei Nakada, Tokyo (JP); Ryo Tabata, Tokyo (JP); Takeshi Kawachi, Tokyo (JP); Takeshi Toyoda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/032,108

(22) PCT Filed: Oct. 13, 2021

(86) PCT No.: PCT/JP2021/037961
§ 371 (c)(1),
(2) Date: Apr. 14, 2023

(87) PCT Pub. No.: WO2022/080431
PCT Pub. Date: Apr. 21, 2022

(65) Prior Publication Data
US 2023/0399729 A1   Dec. 14, 2023

(30) Foreign Application Priority Data
Oct. 15, 2020   (JP) ................................ 2020-173813

(51) Int. Cl.
*C22C 38/60* (2006.01)
*C22C 38/00* (2006.01)
(Continued)

(52) U.S. Cl.
CPC ............ *C22C 38/60* (2013.01); *C22C 38/001* (2013.01); *C22C 38/002* (2013.01);
(Continued)

(58) Field of Classification Search
None
See application file for complete search history.

(56) References Cited

U.S. PATENT DOCUMENTS

| | | | |
|---|---|---|---|
| 2,157,354 A | | 5/1939 | Sherman |
| 4,213,323 A | * | 7/1980 | De Deugd ............ B21C 37/292 72/370.27 |

(Continued)

FOREIGN PATENT DOCUMENTS

| | | |
|---|---|---|
| JP | 2016-159300 A | 9/2016 |
| JP | 2018-51609 A | 4/2018 |
| JP | 6610788 B2 | 11/2019 |

*Primary Examiner* — Daniel J. Schleis
(74) *Attorney, Agent, or Firm* — Birch, Stewart, Kolasch & Birch, LLP (57) ABSTRACT

As a burring processed member able to suppress the formation of fatigue cracks in a burring part, one having a structure satisfying the following relations (1) to (3) is disclosed: $3 \leq Ra \leq 100$ ... (1), $3.0 < h$ ... (2), $24 + r - [TS/(40 + 0.28 \times Ra)] < h$ ... (3), where, "Ra" is an arithmetic mean roughness (μm) of the burring end face, "h" is a height (mm) from the first surface to the burring end face, "r" is a radius of curvature (mm) of the curved wall part, and "TS" is the tensile strength (MPa) of the sheet-shaped part.

5 Claims, 6 Drawing Sheets

(51) Int. Cl.
| | |
|---|---|
| *C22C 38/02* | (2006.01) |
| *C22C 38/04* | (2006.01) |
| *C22C 38/06* | (2006.01) |
| *C22C 38/34* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/52* | (2006.01) |
| *C22C 38/54* | (2006.01) |
| *C22C 38/58* | (2006.01) |
| *B62D 29/00* | (2006.01) |

(52) U.S. Cl.
CPC .......... *C22C 38/005* (2013.01); *C22C 38/008* (2013.01); *C22C 38/02* (2013.01); *C22C 38/04* (2013.01); *C22C 38/06* (2013.01); *C22C 38/34* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *B62D 29/007* (2013.01)

(56) References Cited

U.S. PATENT DOCUMENTS

| | | | |
|---|---|---|---|
| 10,384,251 B2 * | 8/2019 | Isogai | B21D 19/088 |
| 11,383,288 B2 * | 7/2022 | Ihara | B21D 19/088 |
| 2021/0129491 A1 | 5/2021 | Goto et al. | |

* cited by examiner

BURRING PROCESSED MEMBER

FIELD

The present application discloses a burring processed member.

BACKGROUND

As disclosed in PTL 1, technology has been developed employing high strength steel as a material for parts so as to reduce the weight of the parts. Here, high strength steel is susceptible to crack growth when a fatigue crack occurs. For this reason, in a part made of high strength steel, it tends to be difficult to secure as much fatigue resistance hoped for due to the higher strength of the material.

CITATIONS LIST

Patent Literature

[PTL 1] Japanese Patent No. 6610788

SUMMARY

Technical Problem

To improve the fatigue resistance of a part, it is considered effective to suppress the very formation of fatigue cracks at a part. In particular, a burring processed member is often used for parts receiving an external force. It is considered that fatigue cracks easily occur in a burring processed part. In this regard, new technology is necessary for suppressing the formation of fatigue cracks at a burring processed part.

Solution to Problem

As one of the means for solving the above problem, the present application discloses
a burring processed member comprising a sheet-shaped part and a burring processed part, wherein
the sheet-shaped part has a first surface at one side and a second surface at an opposite side to the first surface,
the burring processed part has a burring hole and a burring wall part,
the burring wall part is provided around the burring hole,
the burring wall part sticks out to one side from the first surface,
the burring wall part has a vertical wall part and a curved wall part,
the vertical wall part has a burring end face at one side and is connected to the curved wall part at an opposite side to the one side,
the curved wall part is connected to the vertical wall part at one side and is connected to the sheet-shaped part at an opposite side to the one side, and
the burring processed part has a structure satisfying the following relations (1) to (3):

$$3 \leq Ra \leq 100 \qquad (1)$$

$$3.0 < h \qquad (2)$$

$$24 + r - [TS/(40 + 0.28 \times Ra)] < h \qquad (3)$$

where,
"Ra" is an arithmetic mean roughness (lam) of the burring end face,
"h" is a height (mm) from the first surface to the burring end face,
"r" is a radius of curvature (mm) of the curved wall part, and
"TS" is the tensile strength (MPa) of the sheet-shaped part.

In the burring processed member of the present disclosure, a diameter "d" of the burring hole may be 20.0 mm or more and 100.0 mm or less.

In the burring processed member of the present disclosure, "r" may be 2.0 mm or more and mm or less.

In the burring processed member of the present disclosure, "TS" may be 780 MPa or more.

In the burring processed member of the present disclosure, "Ra" may be 50 μm or less.

Advantageous Effects of Invention

In the burring processed member of the present disclosure, fatigue cracks are less likely to occur at the burring processed part.

BRIEF DESCRIPTION OF DRAWINGS

FIGS. 1A to 1C schematically show one example of the structure of a burring processed member, wherein

DESCRIPTION OF EMBODIMENTS

Figure 1A:
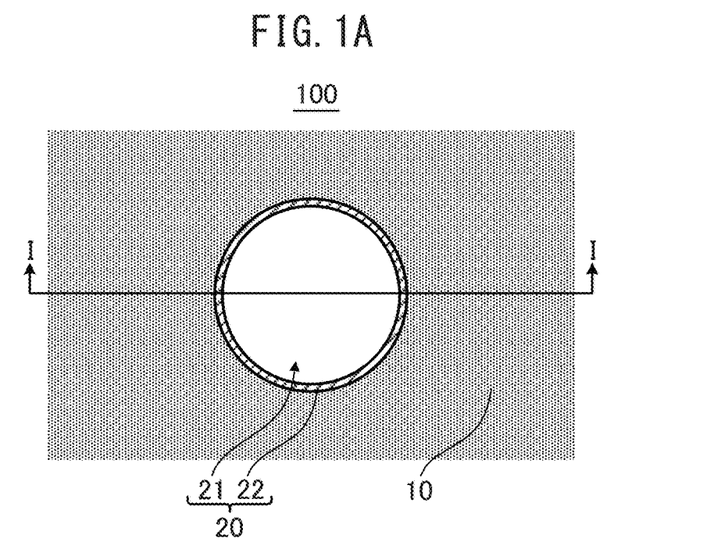
FIG. 1A is a plan view and FIGS. 1B and 1C are cross-sectional views along the arrow mark I-I of FIG. 1A.
Figure 1B:
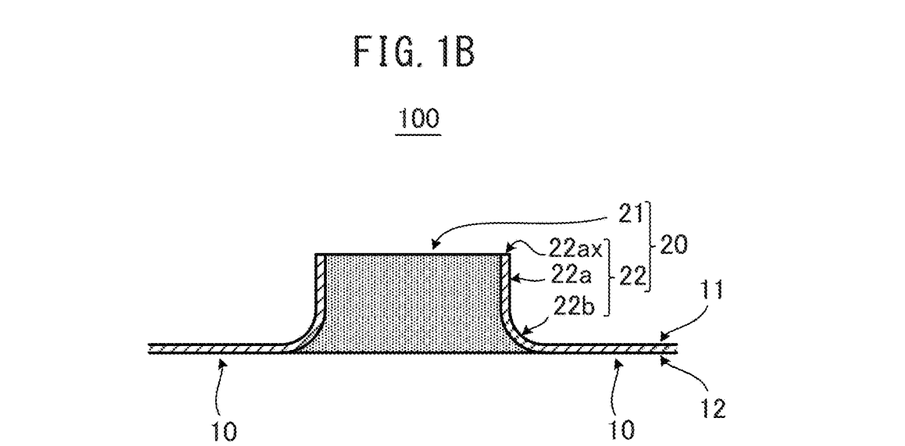
Figure 1C:
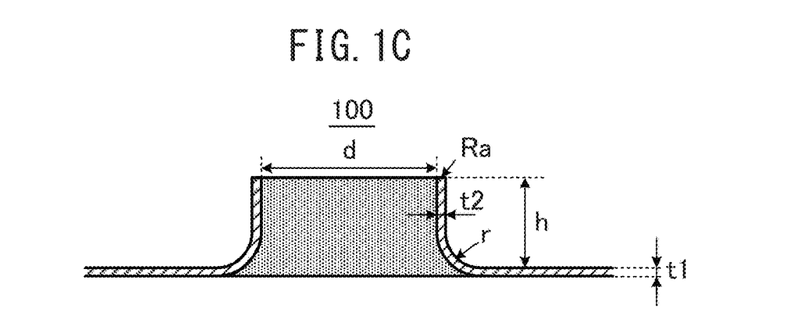

As shown in FIGS. 1A to 1C, the burring processed member 100 has a sheet-shaped part 10 and a burring processed part 20. The sheet-shaped part 10 has a first surface 11 at one side and a second surface 12 at an opposite side to the first surface 11. The burring processed part 20 has a burring hole 21 and a burring wall part 22. The burring wall part 22 is provided around the burring hole 21. The burring wall part 22 sticks out to one side from the first surface 11. The burring wall part 22 has a vertical wall part 22a and a curved wall part 22b. The vertical wall part 22a has a burring end face 22ax at one side and is connected to the curved wall part 22b at the opposite side to the one side. The curved wall part 22 is connected to the vertical wall part 22a at one side and is connected to the sheet-shaped part 10 at the opposite side to the one side. The burring processed part 20 has a structure satisfying the following relations (1) to (3).

$$3 \leq Ra \leq 100 \quad (1)$$

$$3.0 < h \quad (2)$$

$$24+r-[TS/(40+0.28 \times Ra)] < h \quad (3)$$

where,

"Ra" is an arithmetic mean roughness (μm) of the burring end face,

"h" is a height (mm) from the first surface to the burring end face 22ax,

"r" is a radius of curvature (mm) of the curved wall part 22b, and

"TS" is the tensile strength (MPa) of the sheet-shaped part 10.

1. Sheet-Shaped Part

As shown in FIGS. 1A to 1C, the sheet-shaped part 10 has a first surface 11 at one side and has a second surface 12 at an opposite side to the first surface 11.

As shown in FIGS. 1A to 1C, the sheet-shaped part 10 may be present around the burring processed part 20. At the burring processed member 100, it is sufficient that there be even just a bit of a sheet-shaped part 10. The shape of the outer rim of the sheet-shaped part 10 (planar shape of burring processed member 100 as a whole) is not particularly limited. It may be suitably determined in accordance with the application of the burring processed member 100. The sheet-shaped part 10 does not have to be a completely flat plate shape. For example, it may also have a recessed part, bent part, cutaway part, etc. at part of it.

As shown in FIG. 1C, the sheet-shaped part 10 may have a thickness t1. The thickness t1 may be suitably determined in accordance with the application. If making the thickness t1 of the member thin, the rigidity of the member falls, so the member has to be strengthened. However, the fatigue resistance is liable to fall due to increasing the strength of the member and making the member thinner. In contrast, according to the art of the present disclosure, it is possible to secure excellent fatigue resistance in a burring processed member even when the thickness t1 is thin or the member is high in strength. The thickness t1 may for example be 0.5 mm or more, 0.8 mm or more, 1.0 mm or more, 1.2 mm or more, or 2.0 mm or more and may be 10.0 mm or less, 5.0 mm or less, 4.0 mm or less, 3.0 mm or less, 2.7 mm or less, 2.5 mm or less, 2.3 mm or less, 2.1 mm or less, or 2.0 mm or less. The thickness t1 may be the same in the sheet-shaped part 10 as a whole or may differ for each portion of the sheet-shaped part 10.

2. Burring Processed Part

As shown in FIGS. 1A to 1C, the burring processed part 20 has a burring hole 21 and a burring wall part 22.

2.1. Burring Hole

As shown in FIGS. 1A to 1C, the burring hole 21 is a hole running from one side to the other side of the burring processed part 20. As shown in FIG. 1A, the planar shape (open shape) of the burring hole 21 is circular. "Circular" does not have to be a perfect circle. A certain amount of error able to be allowed in industrial production is also possible. For example, if deeming the length of the line running from one point of the outer rim of the open shape of the burring hole 21 through the center of the open shape to another point on the outer rim as the diameter of the burring hole 21, it is possible to deem a shape as "circular" if the ratio of the maximum diameter to the minimum diameter is 1.00 or more and 1.10 or less.

The size of the burring hole 21 is not particularly limited and may be determined in accordance with the application of the burring processed member 100. As shown in FIG. 1C, the burring hole 21 may have an open shape comprised of the circular shape of the diameter "d". The diameter "d" of the burring hole 21 is, for example, 20.0 mm or more, 30.0 mm or more, mm or more, 50.0 mm or more, 60.0 mm or more, 70.0 mm or more, 80.0 mm or more, or mm or more and may be 100.0 mm or less, 90.0 mm or less, 80.0 mm or less, 70.0 mm or less, 60.0 mm or less, 50.0 mm or less, 40.0 mm or less, or 30.0 mm or less. If the diameter "d" is 20.0 mm or more and 100.0 mm or less, it is easy to further improve the fatigue resistance of the burring processed member 100. Further, the diameter "d" of the burring hole 21 may be 5 times or more or 10 times or more and 100 times or less or 50 times or less of the above thickness t1.

2.2. Burring Wall Part

As shown in FIGS. 1A to 1C, the burring wall part 22 is provided around the burring hole 21. In other words, the open shape of the burring hole 21 is defined by the inner wall of the burring wall part 22. As shown in FIGS. 1A to 1C, the burring wall part 22 may also have a cylindrical shaped part.

As shown in FIGS. 1B and 1C, the burring wall part 22 sticks out to one side from the first surface 11. The direction at which the burring wall part 22 sticks out is the direction intersecting the surface direction of the sheet-shaped part 10. For example, it may be a direction perpendicular to the surface direction of the sheet-shaped part 10.

As shown in FIG. 1B, the burring wall part 22 has a vertical wall part 22a and a curved wall part 22b. As shown in FIGS. 1B and 1C, the vertical wall part 22a has a burring end face 22ax at one side and is connected to the curved wall part 22b at the opposite side from the one side. The vertical wall part 22a may have a surface running along a punching direction at the time of burring. As shown in FIGS. 1B and 1C, in the cross-sectional shape along the center axis of the burring hole 21, the parts of the inner wall surface of the vertical wall part 22a facing each other may be parallel with each other. Further, as shown in FIGS. 1B and 1C, the orientation of the outer wall surface of the vertical wall part 22a and the orientation of the first surface 11 of the sheet-shaped part 10 intersect each other. For example, they may be perpendicular with each other. Further, as shown in FIG. 1C, the burring wall part 22 may have a predetermined height "h" from the first surface 11 to the burring end face 22ax of the vertical wall part 22a. Further, as shown in FIG. 1C, the burring end face 22ax of the vertical wall part 22a may have a predetermined arithmetic mean roughness "Ra". The height "h" and the arithmetic mean roughness "Ra" will be explained later.

As shown in FIGS. 1B and 1C, the curved wall part 22b is connected to the vertical wall part 22a at one side and is connected to the sheet-shaped part 10 at the opposite side to the one side. The curved wall part 22b has a radius of curvature "r" and connects the sheet-shaped part and the vertical wall part 22a. For example, there is no break between the first surface 11 of the sheet-shaped part 10, the outer wall surface of the curved wall part 22b, and the outer wall surface of the vertical wall part 22a. The radius of curvature "r" of the curved wall part 22b will be explained later.

As shown in FIG. 1C, the burring wall part 22 may have a thickness t2. The thickness t2 may be suitably determined according to the strength etc. targeted. The thickness t2 may, for example, be 0.5 mm or more, 0.8 mm or more, 1.0 mm or more, 1.2 mm or more, or 1.8 mm or more and may be 10.0 mm or less, 5.0 mm or less, 3.0 mm or less, 2.8 mm or less, 2.6 mm or less, 2.4 mm or less, 2.2 mm or less, or 2.0 mm or less. The thickness t2 may be substantially the same at the burring wall part 22 as a whole or may be different for each portion of the burring wall part 22. The thickness t2 may be thicker or thinner than the thickness t1, but due to the nature of burring, easily becomes thinner than the thickness t1. Specifically, the ratio t2/t1 of the thickness t2 and thickness t1 may be 0.5 or more, 0.6 or more, or 0.7 or more and may be 1.2 or less, 1.1 or less, or 1.0 or less.

2.3. Relation (1)

As shown in the relation (1), in the burring processed member 100, the arithmetic mean roughness "Ra" of the burring end face 22ax is 3 µm or more and 100 µm or less. By the arithmetic mean roughness "Ra" at the burring end face 22ax being 100 µm or less and the later explained relation (3) being satisfied, even if external force is applied to the burring processed part 20, stress concentration at the burring end face 22ax is less likely to occur and fatigue cracks are less likely to form. As a result, the fatigue resistance of the burring processed member 100 is improved. From the viewpoint of more effectively suppressing the formation of fatigue cracks, the arithmetic mean roughness "Ra" at the burring end face 22ax may be 50 µm or less. On the other hand, the closer the arithmetic mean roughness "Ra" at the burring end face 22ax to 0, the easier it is to suppress the formation of fatigue cracks, but making the arithmetic mean roughness "Ra" a value of 0 is not realistic. To reduce the arithmetic mean roughness "Ra" of the burring end face 22ax, it is effective to smooth the burring end face 22ax. In the burring processed member 100, for example, the burring end face 22ax may be smoothed by mechanical polishing using sandpaper etc. In this case, it is possible to reduce the arithmetic mean roughness "Ra" of the burring end face 22ax down to 3 µm or so. Alternatively, even if finishing such as reaming is applied, it is possible to reduce the arithmetic mean roughness "Ra" down to 3 µm or so. Further, to make the arithmetic mean roughness "Ra" as close as possible to 0 (for example, make it less than 3 µm), for example, it is possible that chemically polishing the burring end face 22ax would be effective, but if considering the cost, the realistic lower limit of the arithmetic mean roughness "Ra" at the burring end face 22ax is 3 µm or so.

Figure 4:
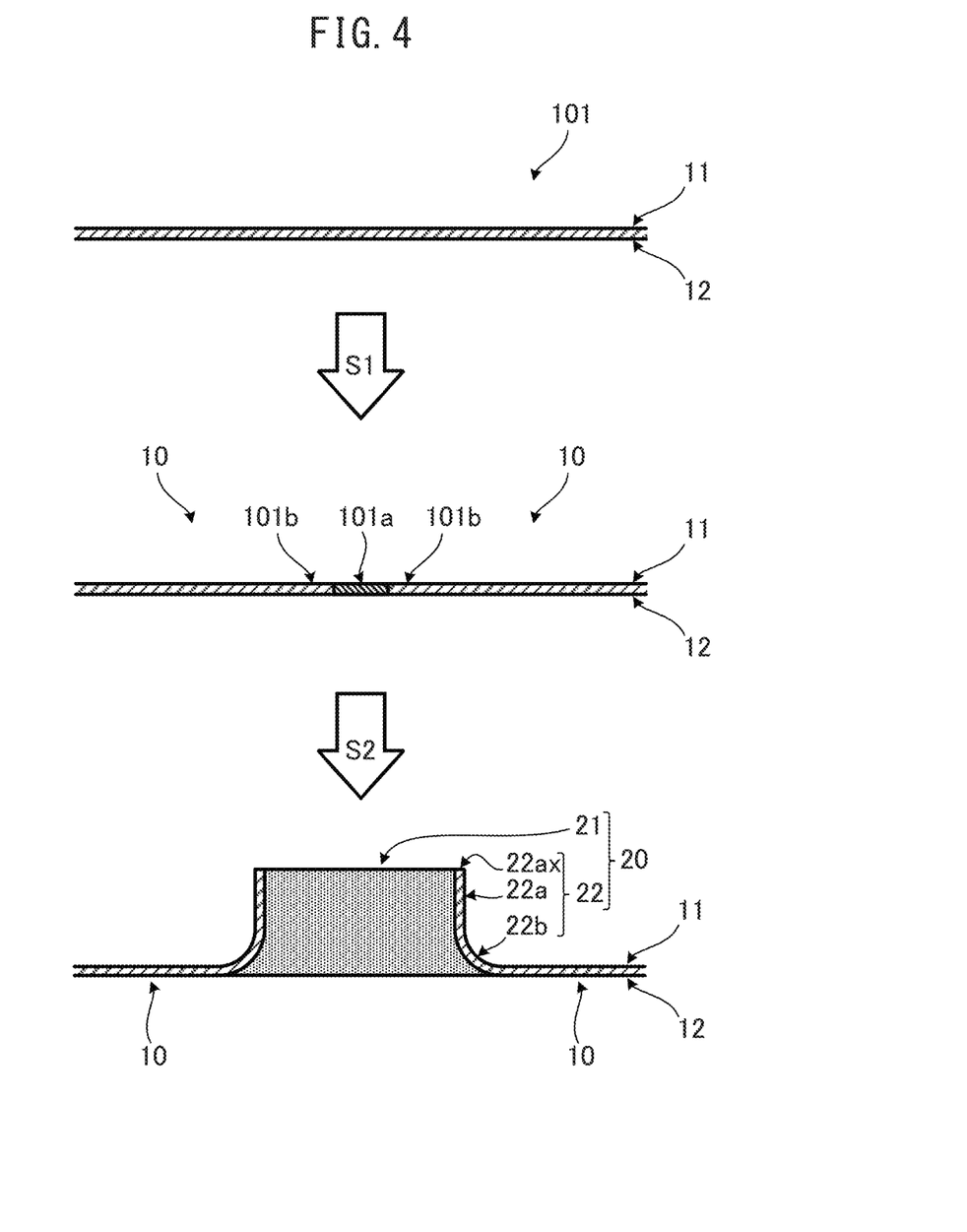
FIG. 4 is a view showing one example of a flow of a method for producing a burring processed member.

As explained later, by providing a punched hole 101a at part of the metal plate 101 being worked and raising the rim part 101b of the punched hole 101a up at one side, when burring it, the end face defining the punched hole 101a can become the burring end face 22ax after burring (see FIG. 4). The arithmetic mean roughness "Ra" of the burring end face 22ax after burring becomes larger than the arithmetic mean roughness at the end face defining the punched hole 101a before burring. The arithmetic mean roughness of the burring end face 22ax changes according to the degree of reduction of thickness at the time of burring (degree of reduction of thickness t2 with respect to the thickness t1) etc. Further, the higher the height "h" of the burring processed part 20 is, the arithmetic mean roughness of the burring end face 22ax becomes larger. As explained later, in the burring processed member 100 of the present disclosure, by smoothing such as polishing the burring end face 22ax using sandpaper, the arithmetic mean roughness "Ra" at the burring end face 22ax may be kept down to 100 µm or less.

The arithmetic mean roughness Ra of the burring end face 22ax is measured using a stylus probe and moving the stylus in the thickness direction of the burring end face. Specifically, in FIG. 1B and FIG. 4, the stylus is moved on the burring end face 22ax in the horizontal direction. The measurement is performed using a stylus comprised of diamond with a tip radius of 2 µm under conditions of a measurement force of 0.75 mN and a measurement speed of 0.15 mm/s. The arithmetic mean roughness is measured at any five locations along the circumferential direction of the burring hole. The average of this is made the arithmetic mean roughness of the burring end face.

2.4. Relation (2)

As shown in the relation (2), in the burring processed member 100, the height "h" from the first surface 11 to the burring end face 22ax is larger than 3.0 mm. In this way, by the height "h" of the burring wall part 22 being larger than 3.0 mm and being a height satisfying the following relation (3), even if stress $\sigma_0$ occurs due to torsion at the sheet-shaped part 10, the stress $\sigma_c$ from the sheet-shaped part 10 through the burring wall part 22 to the burring end face 22ax becomes smaller. As a result, stress concentration is less likely to occur at the burring end face 22ax and fatigue cracks are less likely to form. The upper limit of the height "h" is not particularly prescribed. The height "h" may also be, for example, 1000.0 mm or less, 500.0 mm or less, or 100.0 mm or less. Further, the height "h" may also, for example, be 1000 times or less of the thickness t1, 500 times or less, or 100 times or less.

2.5. Relation (3)

In the burring processed member 100 of the present disclosure, in addition to the relations (1) and (2), it is important that the burring processed part 20 have a structure satisfying the above relation (3). That is, even if, as shown in the above relations (1) and (2), the arithmetic mean roughness "Ra" at the burring end face 22ax is 100 µm or less and the height "h" of the burring processed part 20 is larger than 3.0 mm, if the relation (3) is not satisfied, the fatigue resistance at the burring processed part 20 tends to be difficult to improve.

Figure 2:
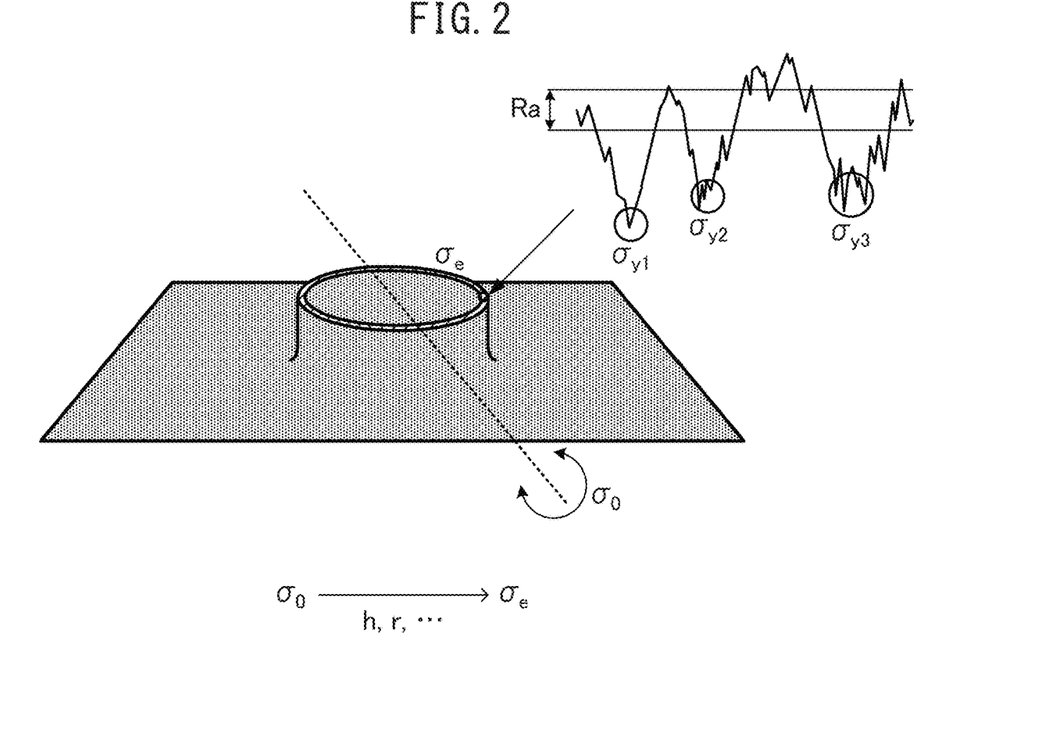
FIG. 2 shows a stress $\sigma_e$ transmitted to a burring end face if an external force $\sigma_0$ is applied to a burring processed member and a stress concentration $\sigma_{y1}$ to $\sigma_{y3}$ occurring at valley parts of the burring end face.

As shown in FIG. 2, if a stress $\sigma_0$ is applied to the sheet-shaped part 10 of the burring processed member 100 by torsion etc., stress $\sigma_e$ is transmitted from the sheet-shaped part 10 to the burring end face 22ax and stress concentration $\sigma_{y1}$ to $\sigma_{y3}$ forms in the recessed part (valley part) of the surface of the burring end face 22ax. If the stress concentration at the burring end face 22ax is large, fatigue cracks easily form. To suppress stress concentration at the burring end face 22ax, increasing the height "h" of the burring processed part 20 is effective. Further, stress concentration at the burring end face 22ax changes also due to factors other than the height "h". According to discoveries of the present inventor, to reduce the stress concentration at the burring end face 22ax, suppress the formation of fatigue cracks, and raise the fatigue resistance of the burring processed part 20, it is effective to (I) increase the height "h", the larger the radius of curvature "r" of the curved wall part 22b, (II) increase the height "h", the smaller the tensile strength "TS" of the sheet-shaped part 10, and (III) increase the height "h", the larger the arithmetic mean roughness "Ra" at the burring end face 22ax. The present inventor engaged in intensive research and as a result discovered that it is possible to clean up the relations according to (I) to (III) by the above relation (3).

In the above relation (3), the arithmetic mean roughness "Ra" at the burring end face 22ax is as already explained.

In the above relation (3), the value of the radius of curvature "r" of the curved wall part 22b is not particularly limited. The radius of curvature "r" may, for example, be 2.0 mm or more and 10.0 mm or less. If the radius of curvature "r" of the curved wall part 22b is 2.0 mm or more, wrinkles and cracking and buckling deformation etc. are less likely to occur at the curved wall part 22b. If the radius of curvature "r" of the curved wall part 22b is 10.0 mm or less, the stress at the sheet-shaped part 10 becomes even harder to transmit to the vertical wall part 22a and burring end face 22ax.

Figure 3:
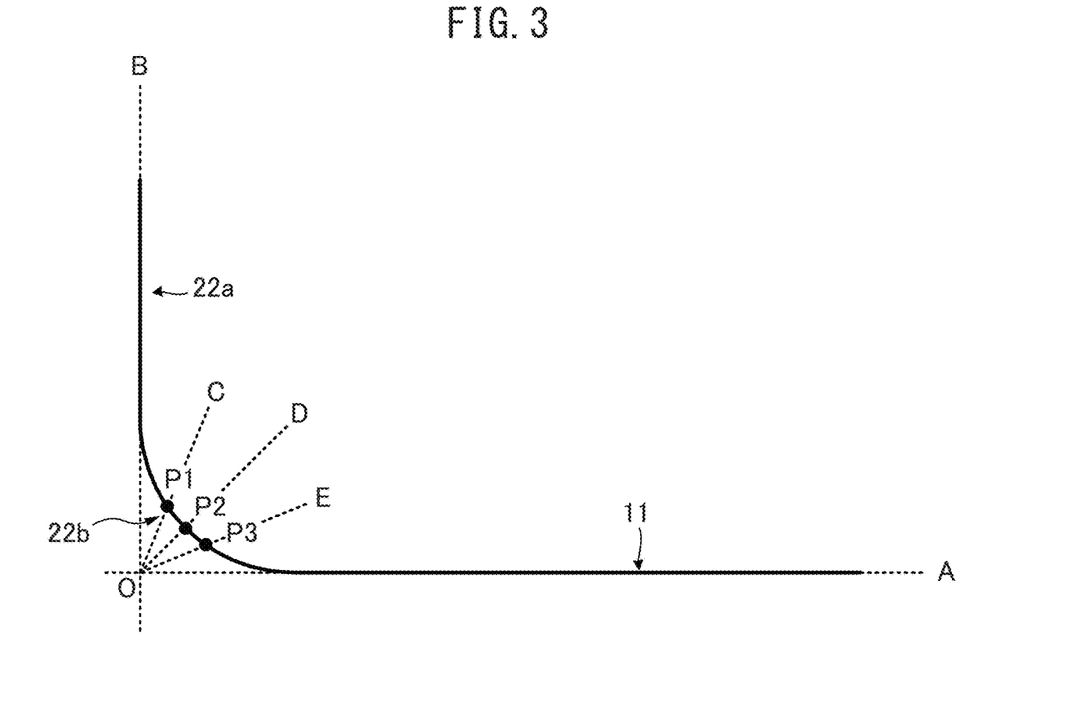
FIG. 3 shows a method of specifying a radius of curvature of a curved wall part.

As shown in FIG. 3, the radius of curvature "r" of the curved wall part 22b can be specified by the cross-sectional shape of the burring processed member 100 which runs along the center axis of the burring hole 21. That is, as shown in FIG. 3, in the cross-sectional shape, a line A is drawn along the first surface 11 of the sheet-shaped part 10 (in the first surface 11, the part deemed smooth near the curved wall part 22b) and a line B is drawn along the outer wall surface of the vertical wall part 22a (at the outer wall surface, the surface running in the projecting direction at the time of burring). An intersecting point O of the line A and the line B is specified. From the intersecting point O, three lines C, D, and E equally dividing the corner AOB into four equal parts are drawn. The intersecting point P1 of the line C and the outer wall surface of the curved wall part 22b, the intersecting point P2 of the line D and the outer wall surface of the curved wall part 22b, and the intersecting point P3 of the line E and the outer wall surface of the curved wall part 22b are specified. One circle passing through these three intersecting points P1, P2, and P3 are specified and the radius of the circle is made the radius of curvature "r" of the curved wall part 22b.

In the above formula (3), the value of the tensile strength "TS" at the sheet-shaped part 10 is not particularly limited. As explained above, the problem of the fatigue resistance of the burring processed part 20 particularly easily occurs at a high strength steel plate. In this regard, the tensile strength "TS" of the sheet-shaped part 10 may be 780 MPa or more, 800 MPa or more, 850 MPa or more, 900 MPa or more, 950 MPa or more, 980 MPa or more, 1000 MPa or more, 1050 MPa or more, 1100 MPa or more, 1150 MPa or more, 1180 MPa or more, 1200 MPa or more, 1250 MPa or more, 1300 MPa or more, 1350 MPa or more, 1400 MPa or more, 1450 MPa or more, or 1470 MPa or more. The upper limit of the tensile strength of the sheet-shaped part 10 is not particularly prescribed, but, for example, may be 2500 MPa or less, 2200 MPa or less, or 2000 MPa or less. Further, the "tensile strength" of the sheet-shaped part referred to in the present application is one based on ISO 6892-1: 2009.

According to the findings of the present inventor, along with the higher strength of a material, the properties of the punched end face deteriorate and the surface roughness tends to become greater. That is, the larger the tensile strength "TS" of the sheet-shaped part 10, the more likely it is that the arithmetic mean roughness "Ra" at the burring end face 22ax becomes larger. If the tensile strength "TS" of the sheet-shaped part 10 is 780 MPa or more, the burring end face 22ax may be, for example, smoothed in order to make the arithmetic mean roughness "Ra" at the burring end face 22ax 100 μm or less, preferably 50 μm or less.

3. Material

The fact that the burring processed member 100 is made of metal is self-evident. The burring processed member 100, for example, may also be comprised of a steel material. In this case, the chemical composition or metal structure of the steel material is not particularly limited and can be suitably determined in accordance with the application of the burring processed member 100. In the burring processed member 100 of the present disclosure, the necessary height "h" at the burring part 20 changes according to the tensile strength of the sheet-shaped part 10, but does not substantially change depending on the chemical composition or metal structure of the burring processed member 100. That is, according to the art of the present disclosure, in burring processed members 100 having various chemical compositions and metal structures, it is possible to suppress the formation of fatigue cracks at the burring part 20. As one example of the chemical composition, the burring processed member 100 may have a chemical composition comprised of, by mass %, C: 0.01 to 1.0%, Si: 0.01 to 3.50%, Mn: 0.10 to 5.00%, P: 0.100% or less, S: 0.0300% or less, N: 0.0100% or less, O: 0 to 0.020%, Al: 0 to 1.000% or less, Cr: 0 to 2.00%, Cu: 0 to 2.00%, Ni: 0 to 2.00%, Mo: 0 to 3.00%, Co: 0 to 3.00%, Nb: 0 to 0.150%, V: 0 to 1.00%, Ti: 0 to 1.00%, W: 0 to 1.00%, Sn: 0 to 1.00%, Sb: 0 to 0.50%, Ta: 0 to 0.10%, As: 0 to 0.050%, B: 0 to 0.0100%, Ca: 0 to 0.100%, Mg: 0 to 0.100%, Zr: 0 to 0.100%, Hf: 0 to 0.100%, REM: 0 to 0.0050%, and a balance: Fe and impurities. Further, in the chemical composition, the lower limits of the contents of the optional elements may be 0.0001% or 0.001%.

4. Number and Positions of Burring Processed Parts

At the burring processed member 100, the number of burring processed parts 20 is not limited to one. The burring processed member 100 may also have a plurality of burring processed parts 20. Further, the burring processed member 100 may be further provided with, in addition to a burring processed part 20, another burring processed part which sticks out to the one side of the first surface 11 and may be further provided with another burring processed part sticking out to the other side from the second surface 12. The position of the burring processed part 20 at the burring processed member 100 is also not particularly limited and may be suitably determined in accordance with the application of the burring processed member 100.

5. Application of Burring Processed Member

As explained above, the burring processed member 100 of the present disclosure is resistant to formation of fatigue cracks at the burring processed part 20 even if torsion or other external force is applied and has excellent fatigue resistance. In this regard, the burring processed member 100 of the present disclosure can be applied to the harsh environments in which a large external force is applied. For example, the burring processed member 100 of the present disclosure may also be used as a chassis part of an automobile. As specific examples of chassis parts of automobiles, a lower arm or upper arm and trail link may be mentioned.

6. Method of Production of Burring Processed Member

The burring processed member 100 of the present disclosure can be produced by burring a part of the metal plate being worked. For example, as shown in FIG. 4, the method of production of the burring processed member 100 may be provided with the following S1 and S2 and may be provided with at least one of the following S2I and S2II:

S1: Providing a punched hole 101a in part of the metal plate 101, wherein the metal plate 101 has a first surface 11 at one side and a second surface 12 at an opposite side to the first surface 11 and a sheet-shaped part 10 is provided around the punched hole 101a.

S2: Raising a rim part 101b of the punched hole 101a to one side from the first surface 11 to thereby provide a burring processed part 20, wherein the burring processed part 20 has a burring hole 21 and a burring wall part 22, the burring wall part 22 is provided around the burring hole 21, the burring wall part 22 sticks out to one side from the first surface 11, the burring wall part 22 has a vertical wall part 22a and a curved wall part 22b, the vertical wall part 22a has a burring end face 22ax at one side and is connected to the curved wall part 22b at the opposite side to the one side, and the curved wall part 22b is connected to the vertical wall part 22a at one side and is connected to the sheet-shaped part 10 at the opposite side to the one side.

S2I: Before S2, determining the height "h" of the burring processed part 20 provided at S2 considering the radius of curvature "r" of the curved wall part 22b of the burring wall part 22, the tensile strength "TS" of the sheet-shaped part 10, and the arithmetic mean roughness "Ra" at the burring end face 22ax after burring so that the burring processed part 20 has a structure satisfying the above relations (1) to (3).

S2II: After S2, smoothing the burring end face 22ax so that the burring processed part 20 satisfies the above relations (1) to (3).

S1 and S2 may be performed using a punch and die. Further, the arithmetic mean roughness "Ra" at the burring end face 22ax can change according to the conditions at the time of burring (plate holding force, reduction of thickness of the burring wall, etc.). For this reason, it is difficult to estimate the arithmetic mean roughness "Ra" at the burring end face 22ax after burring based on only the arithmetic mean roughness of the end face defining the punched hole 101a and difficult to estimate the necessary height "h". For example, even if reaming the end face defining the punched hole 101a before burring and reducing the arithmetic mean roughness of the end face of the punched hole 101a, relief shapes are formed at the end face by the burring and the arithmetic mean roughness "Ra" of the burring end face 22a after burring can be greatly increased, so the desired arithmetic mean roughness "Ra" at the burring end face 22ax will not always be able to be achieved. At S2I, for example, it is also possible to determine the height "h" based on results, possible to determine the height "h" by advance experiments, and possible to determine the height "h" by simulation etc. The method of smoothing at S2II is not particularly limited. For example, smoothing can be performed by polishing the burring end face 22ax. The polishing can be performed by a known method. For example, mechanical polishing using sandpaper etc. may be mentioned. Alternatively, the burring end face may also be reamed or otherwise finished.

EXAMPLES

Below, the effects etc. by the art of the present disclosure will be explained in detail while giving examples, but the art of the present disclosure is not limited to the following examples.

Figure 5:
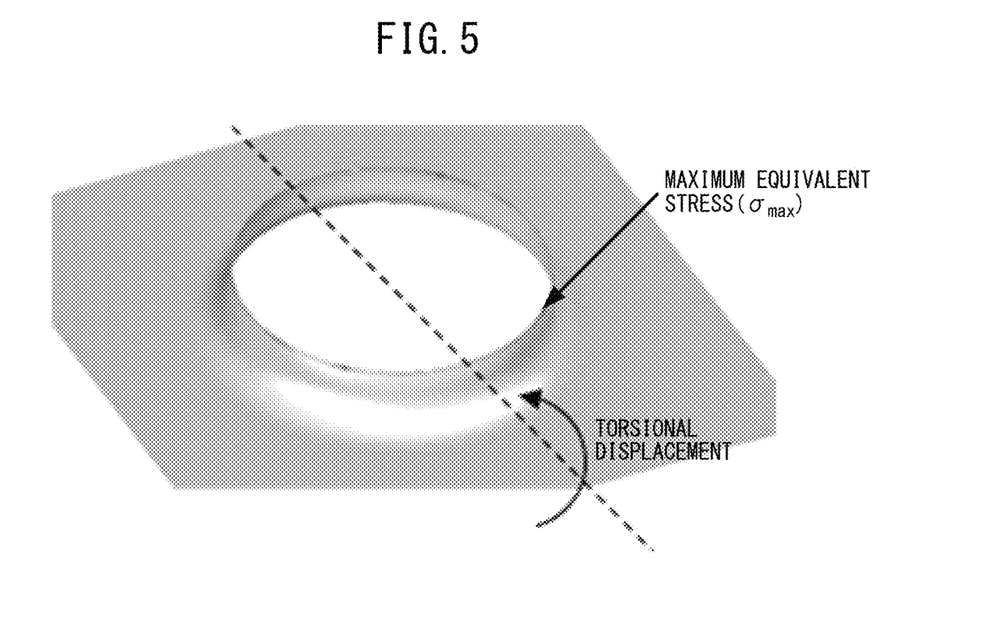
FIG. 5 shows one example of CAE analysis conditions.

1. Evaluation Conditions and Evaluation Criteria (1) As shown in FIG. 5, CAE analysis was used to calculate the maximum value σmax of the equivalent stress occurring at the burring end face when giving torsional displacement to the burring processed member. The height "h" and other conditions of the burring processed part were changed for the analysis. Here, as the CAE analysis software, LS-DYNA ver. 971, rev. 9.3.0 was used. The analysis conditions were set so that the torsional displacement at the steel plate end part became 10°.

Figure 6:
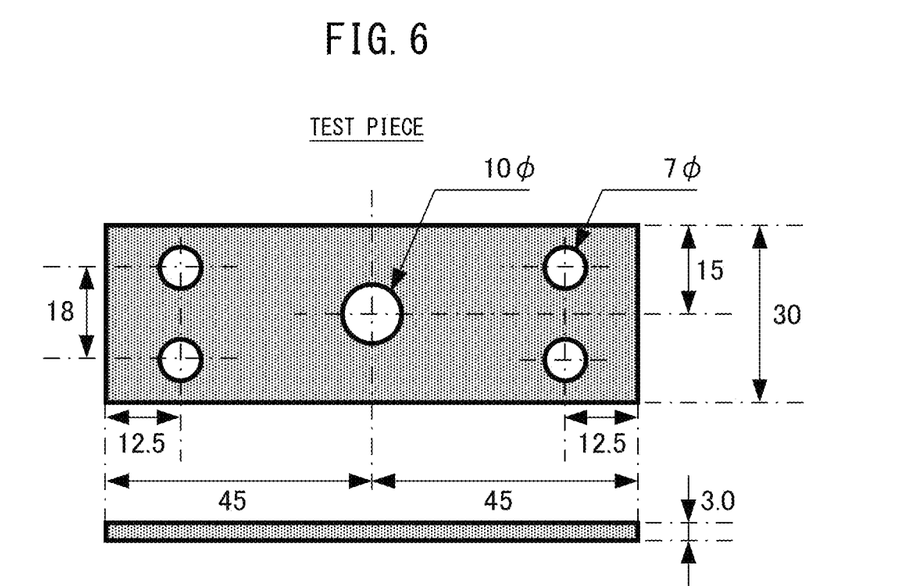
FIG. 6 schematically shows a punched fatigue test piece.

(2) The punched hole defined by the end face having the predetermined arithmetic mean roughness $Ra_1$ was measured for strength at finite life $\sigma f_1$ by a punching fatigue test 2,000,000 times. Here, the punching fatigue test was performed by obtaining a punching fatigue test piece as shown in FIG. 6 so that the punched hole became the center part of the test piece and following the method of double swing plane bending fatigue testing described in JIS Z 2275-1978. Several types of plate members with different $Ra_1$ were subjected to punching fatigue tests. Further, $Ra_1$ was made to change by the material quality, reaming, and the punching clearance. The values of $\sigma f_1$ for the various $Ra_1$ were extrapolated using a regression line and a 2,000,000 time strength at finite life equivalent value $\sigma f_2$ at the time the burring end face had an arithmetic mean roughness $Ra_2$ was found.

(3) Cases where the above σmax became smaller than σft were deemed passing while cases where σmax became σft or more were deemed failing.

2. Results of Evaluation

Figure 7:
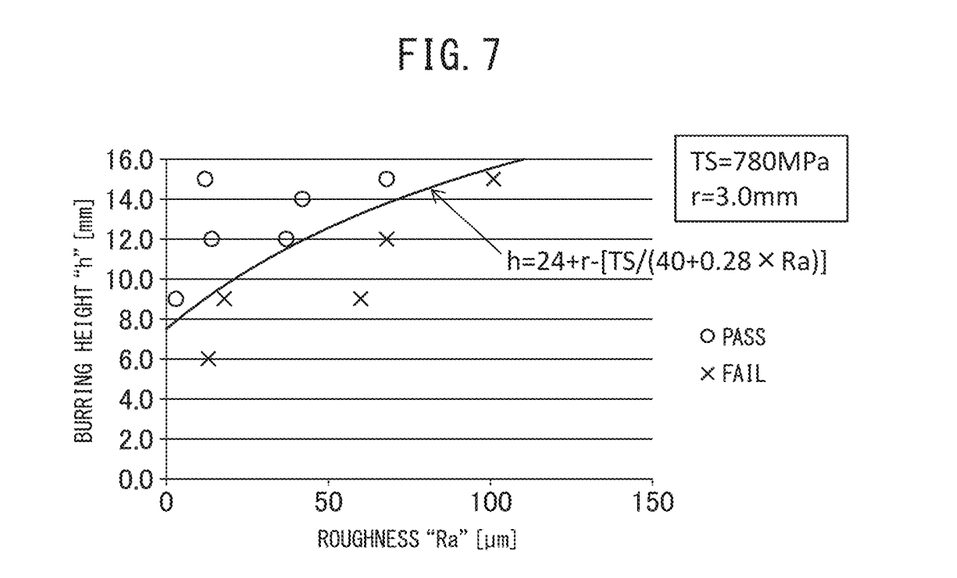
FIG. 7 shows results of evaluation of an example (tensile strength: 780 MPa).
Figure 8:
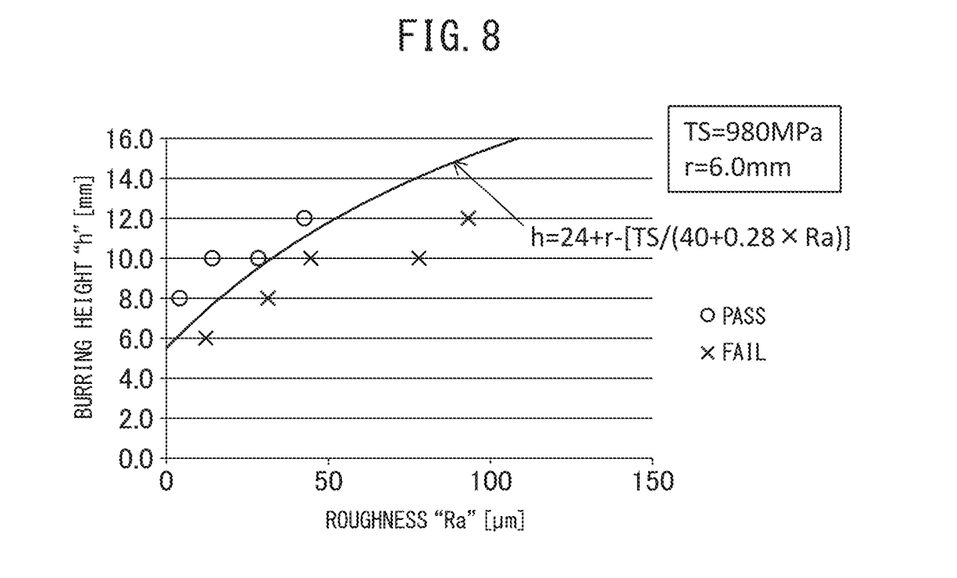
FIG. 8 shows results of evaluation of an example (tensile strength: 980 MPa).
Figure 9:
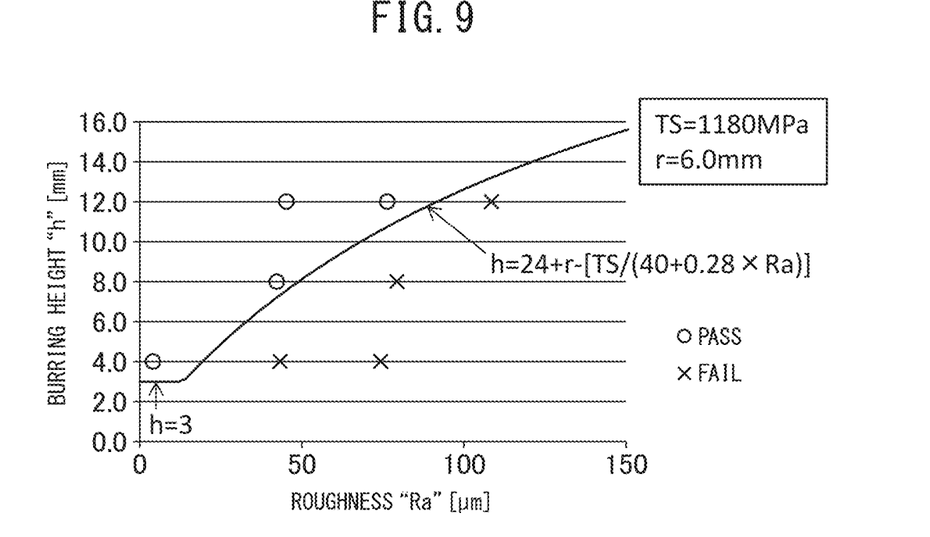
FIG. 9 shows results of evaluation of an example (tensile strength: 1180 MPa).
Figure 10:
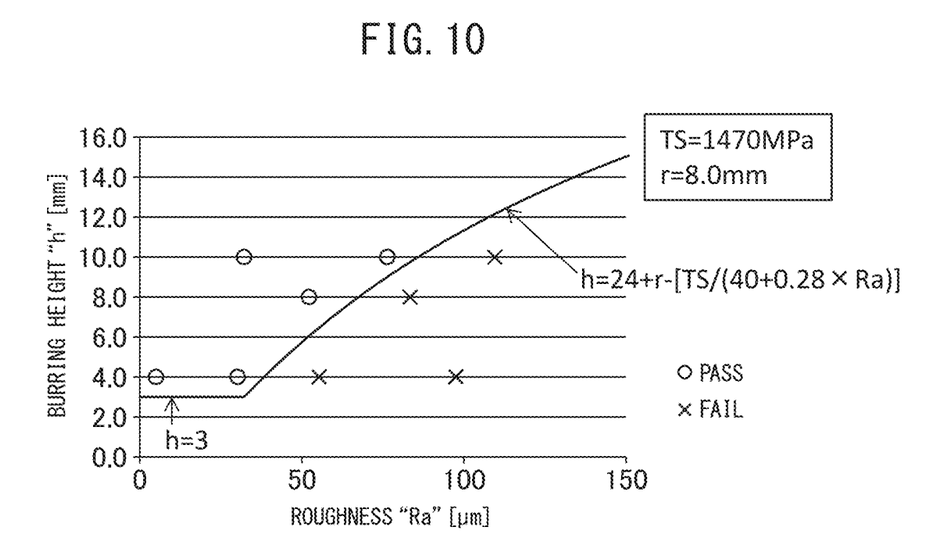
FIG. 10 shows results of evaluation of an example (tensile strength: 1470 MPa).

The following Table 1 and Table 2 show the evaluation conditions and evaluation results of the examples and comparative examples. Further, FIG. 7 shows an evaluation result when a steel material with a tensile strength TS of 780 MPa is used, FIG. 8 shows an evaluation result when a steel material with a tensile strength TS of 980 MPa is used, FIG. 9 shows an evaluation result when a steel material with a tensile strength TS of 1180 MPa is used, FIG. 10 shows an evaluation result when a steel material with a tensile strength TS of 1470 MPa is used. The plots in FIGS. 7 to 10 are based on the results shown in Table 1.

TABLE 1

| No. | Tensile strength TS [MPa] | Thickness t1 [mm] | Thickness t2 [mm] | Radius of curvature "r" of curved wall part [mm] | Diameter "d" of burring hole [mm] | Height "h" [mm] | Arithmetic mean roughness $Ra_2$ [μm] | 24 + r-[TS/(40 + 0.28 × $Ra_2$)] [mm] | σmax (①) [MPa] | $\sigma f_2$ (②) [MPa] | Pass/fail (Samples satisfying ① < ② deemed pass) | Remarks |
|---|---|---|---|---|---|---|---|---|---|---|---|---|
| 1 | 780 | 2.7 | 2.4 | 3.0 | 25.0 | 12.0 | 37 | 11.5 | 212 | 258 | Pass | Ex. |
| 2 | 780 | 2.7 | 2.4 | 3.0 | 25.0 | 12.0 | 14 | 9.2 | 212 | 340 | Pass | Ex. |
| 3 | 780 | 2.7 | 2.3 | 3.0 | 25.0 | 15.0 | 68 | 13.8 | 164 | 202 | Pass | Ex. |
| 4 | 780 | 2.7 | 2.5 | 3.0 | 80.0 | 9.0 | 3 | 7.9 | 315 | 378 | Pass | Ex. |
| 5 | 780 | 2.7 | 2.3 | 3.0 | 80.0 | 15.0 | 12 | 9.0 | 219 | 356 | Pass | Ex. |
| 6 | 780 | 4.0 | 3.6 | 3.0 | 25.0 | 14.0 | 42 | 11.9 | 180 | 223 | Pass | Ex. |
| 7 | 780 | 2.7 | 2.3 | 3.0 | 25.0 | 15.0 | 101 | 15.6 | 164 | 150 | Fail | Comp. ex. |
| 8 | 780 | 2.7 | 2.4 | 3.0 | 25.0 | 12.0 | 68 | 13.8 | 212 | 202 | Fail | Comp. ex. |

TABLE 1-continued

| No. | Tensile strength TS [MPa] | Thickness t1 [mm] | Thickness t2 [mm] | Radius of curvature "r" of curved wall part [mm] | Diameter "d" of burring hole [mm] | Height "h" [mm] | Arithmetic mean roughness Ra₂ [μm] | 24 + r-[TS/(40 + 0.28 × Ra₂)] [mm] | σmax (①) [MPa] | σf₂ (②) [MPa] | Pass/fail (Samples satisfying ① < ② deemed pass) | Remarks |
|---|---|---|---|---|---|---|---|---|---|---|---|---|
| 9  | 780  | 2.7 | 2.5 | 3.0 | 25.0 | 9.0  | 60  | 13.3 | 260 | 212 | Fail | Comp. ex. |
| 10 | 780  | 2.7 | 2.5 | 3.0 | 80.0 | 9.0  | 18  | 9.7  | 315 | 305 | Fail | Comp. ex. |
| 11 | 780  | 2.7 | 2.6 | 3.0 | 25.0 | 6.0  | 13  | 9.1  | 363 | 344 | Fail | Comp. ex. |
| 12 | 980  | 2.5 | 2.1 | 6.0 | 25.0 | 12.0 | 42  | 11.1 | 216 | 308 | Pass | Ex. |
| 13 | 980  | 2.5 | 2.2 | 6.0 | 25.0 | 10.0 | 28  | 9.5  | 248 | 362 | Pass | Ex. |
| 14 | 980  | 2.5 | 2.2 | 6.0 | 25.0 | 10.0 | 14  | 7.7  | 248 | 372 | Pass | Ex. |
| 15 | 980  | 2.5 | 2.3 | 6.0 | 80.0 | 8.0  | 4   | 6.2  | 335 | 477 | Pass | Ex. |
| 16 | 980  | 2.5 | 2.1 | 6.0 | 25.0 | 12.0 | 92  | 15.1 | 216 | 208 | Fail | Comp. ex. |
| 17 | 980  | 2.5 | 2.2 | 6.0 | 25.0 | 10.0 | 77  | 14.1 | 248 | 241 | Fail | Comp. ex. |
| 18 | 980  | 2.5 | 2.2 | 6.0 | 25.0 | 10.0 | 44  | 11.3 | 303 | 302 | Fail | Comp. ex. |
| 19 | 980  | 2.5 | 2.3 | 6.0 | 25.0 | 8.0  | 31  | 9.9  | 335 | 320 | Fail | Comp. ex. |
| 20 | 980  | 2.5 | 2.4 | 6.0 | 80.0 | 6.0  | 12  | 7.4  | 367 | 346 | Fail | Comp. ex. |
| 21 | 1180 | 2.3 | 2.1 | 6.0 | 25.0 | 12.0 | 45  | 7.6  | 216 | 360 | Pass | Ex. |
| 22 | 1180 | 2.3 | 2.1 | 6.0 | 25.0 | 12.0 | 76  | 10.7 | 216 | 292 | Pass | Ex. |
| 23 | 1180 | 2.3 | 2.1 | 6.0 | 25.0 | 8.0  | 42  | 7.2  | 280 | 370 | Pass | Ex. |
| 24 | 1180 | 2.3 | 2.1 | 6.0 | 80.0 | 4.0  | 4   | 1.3  | 399 | 506 | Pass | Ex. |
| 25 | 1180 | 2.3 | 2.1 | 6.0 | 25.0 | 12.0 | 108 | 13.2 | 216 | 208 | Fail | Comp. ex. |
| 26 | 1180 | 2.3 | 2.1 | 6.0 | 25.0 | 8.0  | 79  | 11.0 | 280 | 265 | Fail | Comp. ex. |
| 27 | 1180 | 2.3 | 2.1 | 6.0 | 25.0 | 4.0  | 43  | 7.3  | 344 | 320 | Fail | Comp. ex. |
| 28 | 1180 | 2.3 | 2.1 | 6.0 | 80.0 | 4.0  | 74  | 10.6 | 399 | 295 | Fail | Comp. ex. |
| 29 | 1470 | 2.1 | 2.0 | 8.0 | 25.0 | 4.0  | 5   | -3.5 | 347 | 626 | Pass | Ex. |
| 30 | 1470 | 2.1 | 1.9 | 8.0 | 25.0 | 8.0  | 52  | 5.1  | 283 | 424 | Pass | Ex. |
| 31 | 1470 | 2.1 | 1.8 | 8.0 | 25.0 | 10.0 | 76  | 8.0  | 251 | 364 | Pass | Ex. |
| 32 | 1470 | 2.1 | 2.0 | 8.0 | 80.0 | 4.0  | 30  | 1.6  | 402 | 528 | Pass | Ex. |
| 33 | 1470 | 2.1 | 1.8 | 8.0 | 80.0 | 10.0 | 32  | 2.0  | 306 | 515 | Pass | Ex. |
| 34 | 1470 | 2.1 | 1.9 | 8.0 | 25.0 | 8.0  | 83  | 8.8  | 283 | 276 | Fail | Comp. ex. |
| 35 | 1470 | 2.1 | 1.8 | 8.0 | 25.0 | 10.0 | 109 | 11.2 | 251 | 230 | Fail | Comp. ex. |
| 36 | 1470 | 2.1 | 2.0 | 8.0 | 80.0 | 4.0  | 55  | 5.5  | 402 | 376 | Fail | Comp. ex. |
| 37 | 1470 | 2.1 | 2.0 | 8.0 | 80.0 | 4.0  | 97  | 10.1 | 402 | 330 | Fail | Comp. ex. |

TABLE 2

| No. | Tensile strength TS [MPa] | Thickness t1 [mm] | Thickness t2 [mm] | Radius of curvature "r" of curved wall part [mm] | Diameter "d" of burring hole [mm] | Height "h" [mm] | Arithmetic mean roughness Ra₂ [μm] | 24 + r-[TS/(40 + 0.28 × Ra₂)] [mm] | σmax (①) [MPa] | σf₂ (②) [MPa] | Pass/fail (Samples satisfying ① < ② deemed pass) | Remarks |
|---|---|---|---|---|---|---|---|---|---|---|---|---|
| 38 | 980  | 2.5 | 2.1 | 2.0 | 25.0 | 3.0 | 3  | 2.0 | 422 | 416 | Fail | Comp. ex. |
| 39 | 1180 | 2.3 | 2.1 | 6.0 | 80.0 | 3.0 | 4  | 1.3 | 510 | 506 | Fail | Comp. ex. |
| 40 | 1470 | 2.1 | 2.0 | 8.0 | 80.0 | 3.0 | 30 | 1.6 | 530 | 528 | Fail | Comp. ex. |

As shown in Tables 1 and 2 and FIGS. 7 to 10, regardless of the magnitude of the tensile strength "TS", it is learned that if the burring processed part of the burring processed member has a structure satisfying the following relations (1) to (3), σmax becomes smaller than σf₂ (result of evaluation: pass):

$$3 \leq Ra \leq 100 \quad (1)$$

$$3 < h \quad (2)$$

$$24 + r - [TS/(40 + 0.28 \times Ra)] < h \quad (3)$$

where,
"Ra" is an arithmetic mean roughness (lam) of the burring end face,
"h" is a height (mm) from the first surface to the burring end face,
"r" is a radius of curvature (mm) of the curved wall part, and
"TS" is the tensile strength (MPa) of the sheet-shaped part.

In the above evaluation, regarding the radius of curvature "r" of the curved wall part of the burring processed part, r=3.0 mm was illustrated for steel materials with a tensile strength of 780 MPa, r=6.0 mm for steel materials with tensile strengths of 980 MPa and 1180 MP, and r=8.0 mm for steel materials with a tensile strength of 1470 MP, but in the art of the present disclosure, the value of the radius of curvature "r" of the curved wall part is not limited to these. According to the findings of the present inventor, as shown in the above relation (3), by changing the lower limit of the height "h" considering the magnitude of "r", a burring processed member resistant to the formation of fatigue cracks at the burring processed part is obtained.

3. Example of Burring Processed Member

To confirm that the results of the above analysis was suitable, a burring processed member was actually prepared and tested for durability.

3.1. Comparative Example 1

Steel plate having a tensile strength "TS" of the 780 MPa class and a thickness t1 of 2.7 mm was cut to 200 mm square. The center part was punched by a punch to provide a φ20 mm circular punched hole. The arithmetic mean roughness of the end face defining the punched hole was 12 μm. By punching the part provided with the punched hole and raising the rim part of the punched hole to one side of the plate, a burring processed part having a burring hole and a burring wall part was provided. The diameter "d" of the burring hole was 25.0 mm, the thickness t2 of the burring wall part was 2.3 mm, the height "h" from the first surface at one side of the steel plate to the burring end face was 12.0 mm, and the radius of curvature "r" of the curved wall part was 3.0 mm. Such a burring processed member was measured for the arithmetic mean roughness "Ra" of the burring end face, whereupon it was 105 μm. Comparative Example 1 had an "Ra" of more than 100 μm, so did not satisfy the above relation (1). Further, it did not satisfy the above relation (3).

3.2. Comparative Example 2

In the same way as Comparative Example 1, a burring processed member was obtained, then the burring end face was pressed to a mold to bend (coin) a burring curved wall part. Specifically, the burring end face was given a compressive stress of an extent changing in "r" of burring curved wall part. Such a burring processed member was measured for the arithmetic mean roughness "Ra" of the burring end face, whereupon it did not substantially change from 105 μm. That is, Comparative Example 2 had an "Ra" exceeding 100 μm, so at the very least did not satisfy the above relation (1).

3.3. Comparative Example 3

Steel plate having a tensile strength "TS" of the 780 MPa class and a thickness t1 of 2.5 mm was cut to 200 mm square. The center part was punched by a punch to provide a φ20 mm circular punched hole. The arithmetic mean roughness of the end face defining the punched hole was 36 μm. By punching the part provided with the punched hole and raising the rim part of the punched hole to one side of the plate, a burring processed part having a burring hole and a burring wall part was provided. The diameter "d" of the burring hole was 25.0 mm, the thickness t2 of the burring wall part was 2.1 mm, the height "h" from the first surface at one side of the steel plate to the burring end face was 19.0 mm, and the radius of curvature "r" of the curved wall part was 3.0 mm. Such a burring processed member was measured for the arithmetic mean roughness "Ra" of the burring end face, whereupon it was 105 μm. The "Ra" was more than 100 lam, so the above relation (1) was not satisfied. On the other hand, the left side of the above relation (3) became 18.8 mm, so the above relation (3) was satisfied.

3.4. Comparative Example 4

Steel plate having a tensile strength "TS" of the 780 MPa class and a thickness t1 of 2.7 mm was cut to 200 mm square. The center part was punched by a punch to provide a φ20 mm circular punched hole. After that, the punched hole end face was reamed to reduce the surface roughness at the end face. The arithmetic mean roughness of the end face defining the punched hole after being reduced in surface roughness was 5 μm. By punching the part provided with the punched hole and raising the rim part of the punched hole to one side of the plate, a burring processed part having a burring hole and a burring wall part was provided. The diameter "d" of the burring hole was 25.0 mm, the thickness t2 of the burring wall part was 2.3 mm, the height "h" from the first surface at one side of the steel plate to the burring end face was 18.0 mm, and the radius of curvature "r" of the curved wall part was 3.0 mm. Such a burring processed member was measured for the arithmetic mean roughness "Ra" of the burring end face, whereupon it was 106 μm. Comparative Example 4 had an Ra exceeding 100 μm, so did not satisfy the above relation (1) and, further, did not satisfy the above relation (3).

3.5. Comparative Example 5

Steel plate having a tensile strength "TS" of the 980 MPa class and a thickness t1 of 2.5 mm was cut to 200 mm square. The center part was punched by a punch to provide a φ20 mm circular punched hole. The rim part of the punched hole was raised to one side of the plate to provide a burring processed part having a burring hole and burring wall part. The diameter "d" of the burring hole was 25.0 mm, the thickness t2 of the burring wall part was 2.2 mm, the height "h" from the first surface at one side of the steel plate to the burring end face was 10.0 mm, and the radius of curvature "r" of the curved wall part was 6.0 mm. Such a burring processed member was measured for the arithmetic mean roughness Ra of the burring end face, whereupon it was 77 μm. Comparative Example 5 satisfied the relations (1) and (2). On the other hand, the value at the left side of the above relation (3) was 14.1 mm or larger than the height "h", so the above relation (3) was not satisfied.

3.6. Example

The burring processed member was obtained in the same way as Comparative Example 1, then sandpaper was used to polish the burring end face. Due to this, the burring end face was smoothed. As a result, the arithmetic mean roughnesses Ra at the burring end face became a smaller 18 μm. As a result, it was possible to obtain the burring processed member satisfying all of the above relations (1) to (3).

3.7. Results of Evaluation

The burring processed members of Comparative Examples 1 to 5 and the Example were subjected to durability tests imparting repeated stress 2,000,000 times so that the torsional displacement at the end parts of the steel plate became the maximum 10°, whereupon in the burring processed members of Comparative Examples 1 to 5, cracks formed at the burring end faces, while in the burring processed member of Example, no cracks were observed to be formed.

REFERENCE SIGNS LIST

- 10 sheet-shaped part
- 11 first surface
- 12 second surface
- 20 burring processed part
- 21 burring hole
- 22 burring wall part
- 22*a* vertical wall part
- 22*ax* burring end face
- 22*b* curved wall part
- 100 burring processed member
- 101*a* punched hole
- 101*b* rim part of punched hole

The invention claimed is:

1. A burring processed member comprising a sheet-shaped part and a burring processed part, wherein
the sheet-shaped part has a first surface at one side and a second surface at an opposite side to the first surface,
the burring processed part has a burring wall part,
the burring wall part sticks out to one side from the first surface,
the burring wall part has a vertical wall part and a curved wall part,
the vertical wall part has a burring end face at one side and is connected to the curved wall part at an opposite side to the one side,
the curved wall part is connected to the vertical wall part at one side and is connected to the sheet-shaped part at an opposite side to the one side, and
the burring processed part has a structure satisfying the following relations (1) to (3):

$$3 \leq Ra \leq 100 \quad (1)$$

$$3.0 < h \quad (2)$$

$$24 + r - [TS/(40 + 0.28 \times Ra)] < h \quad (3)$$

where,
"Ra" is an arithmetic mean roughness μm of the burring end face,
"h" is a height mm from the first surface to the burring end face,
"r" is a radius of curvature mm of the curved wall part, and
"TS" is the tensile strength MPa of the sheet-shaped part.

2. The burring processed member according to claim 1, wherein the burring processed part has a burring hole, and a diameter "d" of the burring hole is 20.0 mm or more and 100.0 mm or less.

3. The burring processed member according to claim 1, wherein "r" is 2.0 mm or more and 10.0 mm or less.

4. The burring processed member according to claim 1, wherein "TS" is 780 MPa or more.

5. The burring processed member according to claim 1, wherein "Ra" is 50 μm or less.

* * * * *